(12) United States Patent
Huang

(10) Patent No.: US 10,259,950 B2
(45) Date of Patent: Apr. 16, 2019

(54) COATING STRUCTURE FOR FORMING HYDROPHILIC FILM ON SURFACE

(71) Applicant: National Central University, Taoyuan (TW)

(72) Inventor: Chun-Jen Huang, Changhua County (TW)

(73) Assignee: National Central University, Taoyuan (TW)

( * ) Notice: Subject to any disclaimer, the term of this patent is extended or adjusted under 35 U.S.C. 154(b) by 617 days.

(21) Appl. No.: 14/801,822

(22) Filed: Jul. 16, 2015

(65) Prior Publication Data

US 2016/0289461 A1 Oct. 6, 2016

(30) Foreign Application Priority Data

Apr. 2, 2015 (TW) .............................. 104110964 A

(51) Int. Cl.
*C09D 5/16* (2006.01)
*B08B 17/02* (2006.01)
*C09D 7/63* (2018.01)

(52) U.S. Cl.
CPC .............. *C09D 5/1625* (2013.01); *C09D 7/63* (2018.01)

(58) Field of Classification Search
None
See application file for complete search history.

(56) References Cited

U.S. PATENT DOCUMENTS

| | | | |
|---|---|---|---|
| 6,039,793 A | * | 3/2000 | Gundlach ............. C09D 11/40 106/31.28 |
| 8,236,533 B2 | | 8/2012 | Bridge et al. |

(Continued)

FOREIGN PATENT DOCUMENTS

| | | |
|---|---|---|
| CN | 102307955 A | 1/2012 |
| CN | 102388017 A | 3/2012 |
| TW | 200734423 A | 9/2007 |

OTHER PUBLICATIONS

Abdullah M. Alswieleh et al., "Zwitterionic Poly(amino acid methacrylate)Brushes", Journal of the American Chemical Society, Jun. 2, 2014, 136, 9404-9413.

(Continued)

*Primary Examiner* — Ronak C Patel
(74) *Attorney, Agent, or Firm* — CKC & Partners Co., LLC

(57) ABSTRACT

The present disclosure provides a coated structure for forming a hydrophilic film on a surface. The coated structure includes a carrier substrate and a superhydrophilic material layer. The carrier board has a surface, and the superhydrophilic material layer is coated on the surface of the carrier board. The superhydrophilic material layer is composed of a zwitterionic compound having a chemical formula of (I):

wherein R1 and R2 are individually hydrogen or a C1-C5 alkyl group, and n is an integer of 1-20. A method for antifouling treatment using a coated layer and a method for fouling-resistant treatment using a coated layer are also provided herein.

11 Claims, 2 Drawing Sheets

(56) References Cited

U.S. PATENT DOCUMENTS

| | | | | |
|---|---|---|---|---|
| 2007/0072220 | A1* | 3/2007 | Chilkoti | B01J 19/0046 |
| | | | | 435/6.12 |
| 2009/0149673 | A1 | 6/2009 | Zhang et al. | |
| 2010/0151263 | A1* | 6/2010 | Abys | C23C 22/03 |
| | | | | 428/457 |
| 2011/0305898 | A1* | 12/2011 | Zhang | A61L 27/34 |
| | | | | 428/336 |
| 2016/0193602 | A1* | 7/2016 | Tsai | B01L 3/5085 |
| | | | | 435/5 |

OTHER PUBLICATIONS

Chun-Jen Huang et al., "Sulfur-containing natural zwitterionic amino acids and derivative on gold: Study on physicochemical and anti-fouling properties", GCBME 2014, the 1st Global Conference on Biomedical Engineering and APCMBE 2014, the 9th Asian-Pacific Conference on Medical and Biological Engineering, held at the National Cheng Kung University in Tainan, Taiwan, from Oct. 9 to 12, 2014.

* cited by examiner

COATING STRUCTURE FOR FORMING HYDROPHILIC FILM ON SURFACE

BACKGROUND

This application claims priority to Taiwanese Application Serial Number 104110964, filed Apr. 02, 2015, which is incorporated herein by reference.

Field of Invention

The present disclosure relates to a coating structure. More specifically, the present disclosure relates to a coating structure for forming a hydrophilic film on a surface.

Description of Related Art

Currently, a polymer or a photo-catalyst is usually used in surface treatment for antifouling or fouling-resistant on a material surface. Because of their hydrophilic and charge-balance characteristics, the antifouling or fouling-resistant efficiency is provided. The said polymer usually means a polymer having alkyl silane or polysiloxane, which may be coated on a surface of an object to form a surface microstructure, and the surface microstructure has antifouling or fouling-resistant properties. In another aspect, the photo-catalyst usually means metal or metal oxide, such as nano-silver particles or titanium oxide particles, which decomposes contaminants or bacteria by illumination or chemical activities in nature, so as to provide the antifouling or fouling-resistant efficiency.

However, the polymer coating material may be easily oxidized or decomposed by light after a long period, such that the polymer coating material may deteriorate to lose the antifouling or fouling-resistant properties. Further, the photo-catalyst is usually metal or metal oxide, which has higher chemical activities, so that the photo-catalyst may be not directly coated on a surface of a metal object. Therefore, the application of the photo-catalyst material is limited.

Accordingly, there is a need for an improved coating structure for antifouling or fouling-resistant treatment to solve the aforementioned problems met in the art.

SUMMARY

In view of the problem in the art, the present disclosure provides a novel coating structure for forming a hydrophilic film on a surface, which may be coated on a surface of a metal carrier board, and increase an antifouling and fouling-resistant efficiency of which.

An embodiment of the present disclosure is provided a coating structure for forming a hydrophilic film on a surface. The coating structure includes a carrier board and a superhydrophilic material layer.

The carrier board has a surface. The superhydrophilic material layer is coated on the surface of the carrier board. The superhydrophibic material layer includes a zwitterionic compound having a structure of chemical formula I:

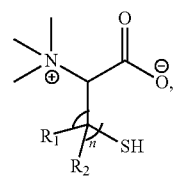

(I)

wherein $R_1$ and $R_2$ are individually hydrogen (H), methyl group ($-CH_3$), ethyl group ($-C_2H_5$) or propyl group ($-C_3H_7$), and n is an integer of 1-20.

According to various embodiments of the present disclosure, a material of the carrier board includes metal selected from the group consisting of silver, gold, copper, iridium, nickel, germanium, mercury, palladium, ruthenium, zinc, iron, barium, yttrium, gallium, cadmium, indium and a combination thereof.

According to various embodiments of the present disclosure, a material of the carrier board includes metal selected from the group consisting of mercury telluride (HgTe), cadmium telluride (CdTe), cadmium sulfide (CdS), silver sulfide (AgS), palladium sulfide (PdS), zinc sulfide (ZnS), gallium arsenide (GaAs), indium phosphide (InP), yttrium barium copper oxide ($YBaCuO_x$) and a combination thereof.

According to various embodiments of the present disclosure, a material of the carrier board includes stainless steel.

According to various embodiments of the present disclosure, the zwitterionic compound has a structure of chemical formula II:

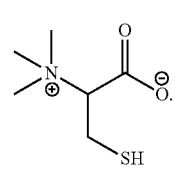

(II)

According to various embodiments of the present disclosure, the zwitterionic compound has a structure of chemical formula III:

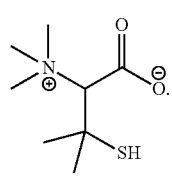

(III)

According to various embodiments of the present disclosure, the zwitterionic compound is adsorbed on the carrier board by a thiol group (—SH).

According to various embodiments of the present disclosure, a coating density of the zwitterionic compound on the carrier board is greater than or equal to 15 $ng/cm^2$.

According to various embodiments of the present disclosure, a coating density of the zwitterionic compound on the carrier board is greater than or equal to 30 $ng/cm^2$.

Another embodiment of the present disclosure is provided a method for antifouling treatment using a coating structure. In the method, the coating structure includes a carrier board and the superhydrophilic material layer mentioned above. The carrier board has a surface. The superhydrophilic material layer is coated on the surface of the carrier board.

Further another embodiment of the present disclosure is provided a method for fouling-resistant treatment using a coating structure. In the method, the coating structure includes a carrier board and the superhydrophilic material layer mentioned above. The carrier board has a surface. The superhydrophilic material layer is coated on the surface of the carrier board.

It is to be understood that both the foregoing general description and the following detailed description are by examples, and are intended to provide further explanation of the present disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

The singular forms "a," "an" and "the" used herein include plural referents unless the context clearly dictates otherwise. Therefore, reference to, for example, a metal layer includes embodiments having two or more such metal layers, unless the context clearly indicates otherwise. Reference throughout this specification to "one embodiment" means that a particular feature, structure, or characteristic described in connection with the embodiment is included in at least one embodiment of the present disclosure. Therefore, the appearances of the phrases "in one embodiment" or "in an embodiment" in various places throughout this specification are not necessarily all referring to the same embodiment. Further, the particular features, structures, or characteristics may be combined in any suitable manner in one or more embodiments. It should be appreciated that the following figures are not drawn to scale; rather, the figures are intended; rather, these figures are intended for illustration.

In view of the problem in the art, the present disclosure provides a novel coating structure for forming a hydrophilic film on a surface, which may be coated on a surface of a metal carrier board, and increase an antifouling and fouling-resistant efficiency of which.

Figure 1:
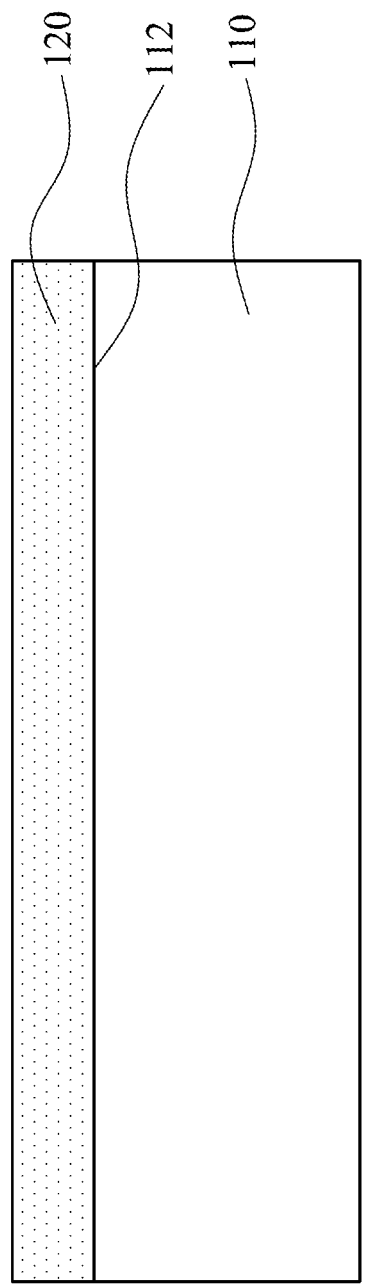
FIG. 1 is a schematic cross-sectional view of a coated structure according to various embodiments of the present disclosure.

FIG. 1 is a schematic cross-sectional view of a coated structure 100 according to various embodiments of the present disclosure. In FIG. 1, the coating structure 100 includes a carrier board 110 and a superhydrophilic material layer 120.

The carrier board 110 has a surface 112. According to various embodiments of the present disclosure, a material of the carrier board includes metal selected from the group consisting of silver, gold, copper, iridium, nickel, germanium, mercury, palladium, ruthenium, zinc, iron, barium, yttrium, gallium, cadmium, indium and a combination thereof. According to various embodiments of the present disclosure, a material of the carrier board includes metal selected from the group consisting of mercury telluride (HgTe), cadmium telluride (CdTe), cadmium sulfide (CdS), silver sulfide (AgS), palladium sulfide (PdS), zinc sulfide (ZnS), gallium arsenide (GaAs), indium phosphide (InP), yttrium barium copper oxide (YBaCuO$_x$) and a combination thererof. According to various embodiments of the present disclosure, a material of the carrier board includes stainless steel.

The superhydrophilic material layer 120 is coated on the surface 112 of the carrier board 110. The superhydrophilic material layer 120 includes a zwitterionic compound having a structure of chemical formula I:

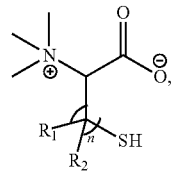

(I)

wherein $R_1$ and $R_2$ are individually hydrogen (H), methyl group (—CH$_3$), ethyl group (—C$_2$H$_5$) or propyl group (—C$_3$H$_7$), and n is an integer of 1-20.

According to various embodiments of the present disclosure, the zwitterionic compound has a structure of chemical formula II:

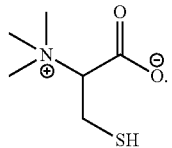

(II)

According to various embodiments of the present disclosure, the zwitterionic compound has a structure of chemical formula III:

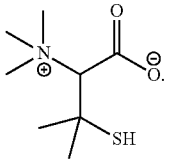

(III)

According to various embodiments of the present disclosure, the zwitterionic compound is adsorbed on the carrier board by a thiol group (—SH). According to various embodiments of the present disclosure, when a material of the carrier board is gold, the thiol group of the zwitterionic compound is formed a thiol-gold bond with the carrier board, so that the zwitterionic compound may be fixed on a surface of the carrier board. According to various embodiments of the present disclosure, a coating density of the zwitterionic compound on the carrier board is greater than or equal to 15 ng/cm$^2$. According to various embodiments of the present disclosure, a coating density of the zwitterionic compound on the carrier board is greater than or equal to 30 ng/cm$^2$.

Figure 2:
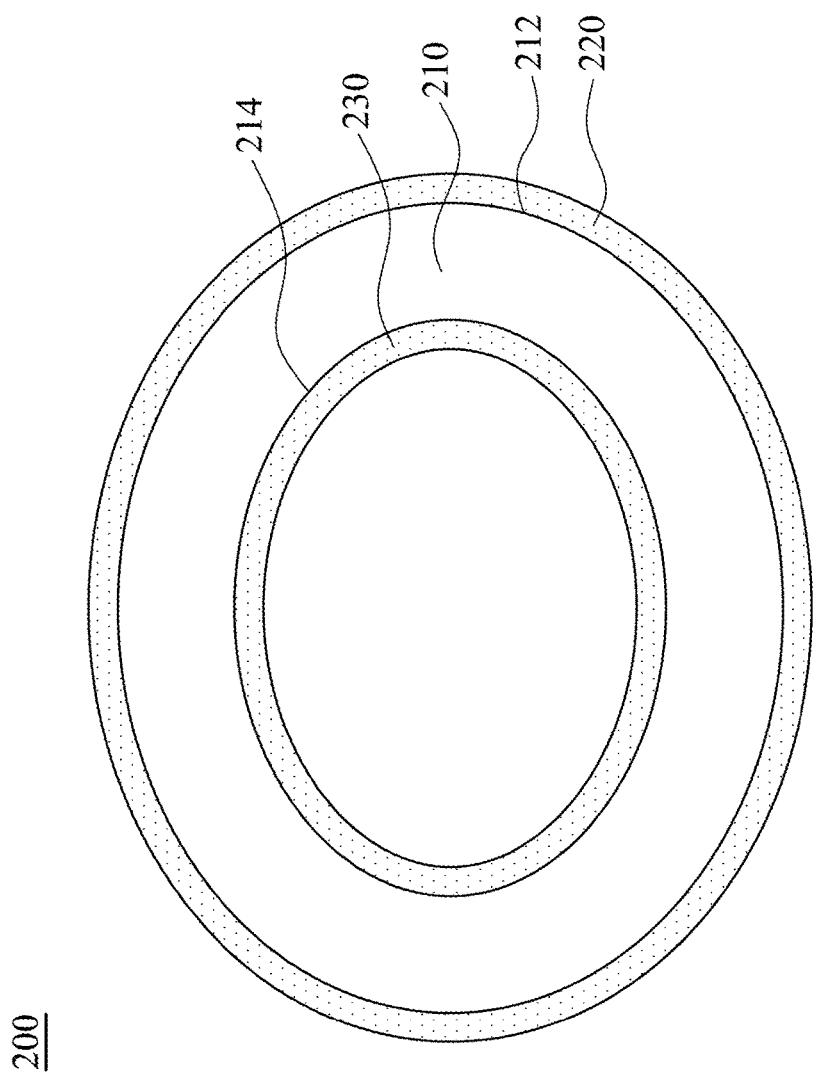
FIG. 2 is a schematic cross-sectional view of a coated structure according to various embodiments of the present disclosure.

FIG. 2 is a schematic cross-sectional view of a coated structure 200 according to various embodiments of the present disclosure. In FIG. 2, the coated structure 200 includes a carrier board 210, a first superhydrophilic material layer 220 and a second superhydrophilic material layer 230.

The carrier board 210 is a tube, and has a first surface 212 and a second surface 214. The first superhydrophilic material layer 220 is coated on the first surface 212 of the carrier board 210; and the second superhydrophilic material layer 230 is coated on the second surface 214 of the carrier board 210.

The first superhydrophilic material layer 220 and the second superhydrophilic material layer 230 both include a zwitterionic compound having a structure of chemical formula I:

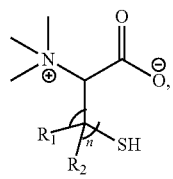
(I)

wherein $R_1$ and $R_2$ are individually hydrogen (H), methyl group (—$CH_3$), ethyl group (—$C_2H_5$) or propyl group (—$C_3H_7$), and n is an integer of 1-20.

In an embodiment of the present disclosure, the carrier board 210 may be a metal tube. According to various embodiments of the present disclosure, a material of the carrier board 210 includes metal selected from the group consisting of silver, gold, copper, iridium, nickel, germanium, mercury, palladium, ruthenium, zinc, iron, barium, yttrium, gallium, cadmium, indium and a combination thereof. According to various embodiments of the present disclosure, a material of the carrier board 210 includes metal selected from the group consisting of mercury telluride (HgTe), cadmium telluride (CdTe), cadmium sulfide (CdS), silver sulfide (AgS), palladium sulfide (PdS), zinc sulfide (ZnS), gallium arsenide (GaAs), indium phosphide (InP), yttrium barium copper oxide (YBaCuO$_x$) and a combination thereof. According to various embodiments of the present disclosure, a material of the carrier board 210 includes stainless steel. When the carrier board 210 is coated by the first superhydrophilic material layer 220 and the second superhydrophilic material layer 230, contaminants or bacteria may be difficult to accumulate or growth on the first surface 212 or the second surface 214 of the carrier board 210, so as to give the antifouling and fouling-resistant efficiency.

In various embodiments of the present disclosure, a synthetic scheme of a zwitterionic compound having a cysteine betaine group is shown as the following scheme (I):

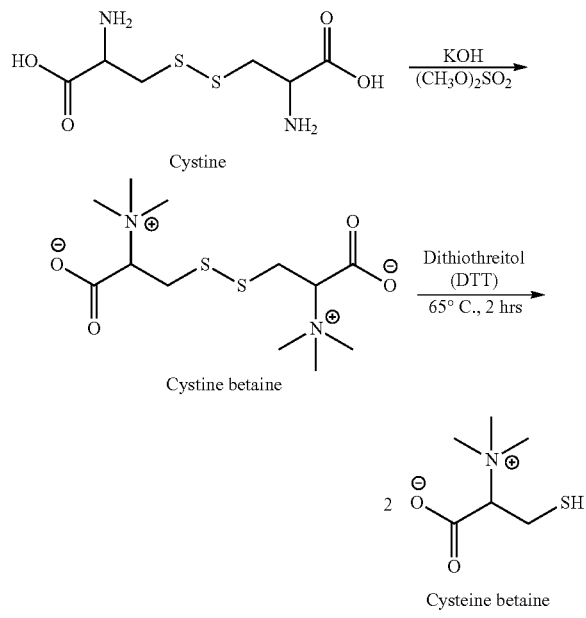

As mentioned above, the synthetic steps of making a cystine betaine in detail is described as following:

1. add 1 g of L-cystine into 3 ml of deionic water to form a solution, and place the solution in an ice bath;
2. add 4.23 ml of 6.5M KOH aqueous solution, and slowly drop into the solution of step 1 till the solution is clear, in which the L-cystine is totally solved, and then stop dropping;
3. add 2.57 ml of dimethyl sulfate (($CH_3O)_2SO_2$, 99.8%), and slowly drop (2-3 minutes per drop) with the residual KOH aqueous solution of step 2 into the solution of step 2;
4. follow step 3 to drop for about 90 minutes;
5. remove the ice bath, and place the reaction solution of step 4 at room temperature, and then keep reacting for about 20 minutes;
6. after add 0.57 ml of iced acetic acid (99.8%), the reaction solution is clear, and then remove the solvent by evaporation, so that the volume of the residue is at least about 4 ml;
7. after add 50 ml of 99.5% ethanol, a great amount of white emulsions are produced, and then remove the byproduct, potassium methyl sulfate, by two layers of filters to collect the filtrate;
8. concentrate the filtrate of step 7 by evaporation, so that the volume of the residue is at least about 4 ml;
9. drop 50 ml of acetone in the concentrated filtrate of step 8, and keep stirring to generate with powder; and
10. centrifuge at 9,000 rpm for 10 minutes to collect the pellet. Repeat steps 7 to 10 three times to remove byproduct and purify the product (cystine betaine). Finally, the product is dried by evaporation to give cystine betaine in white powder.

Next, the synthetic steps of making a cysteine betaine by dithiothreitol (DTT) in detail is described as following:

1. add 154 mg of DTT, and add 1 ml of deionic water to prepare 1M DTT aqueous solution;
2. dilute the DTT aqueous solution of step 1 by water, in which the ratio of the DTT aqueous solution and water is 1:9 (DTT solution:water=1:9);
3. add 1 ml of the diluted DTT aqueous solution prepared in step 2 into 343 mg of cystine betaine, and heating stir at 65° C. for 2 hours to form a cysteine betaine aqueous solution;
4. drop the cysteine betaine aqueous solution into acetone to precipitate cysteine betaine;
5. centrifuge the mixture of step 4 and collect pellet. Repeat steps 4-5 three times to purify the product. Finally, the product is dried by evaporation to give cysteine betaine.

In various embodiments of the present disclosure, when cysteine betaine is modified on a surface of a metal carrier board, a coating density of cysteine betaine on the metal carrier board may affect a contact angle, antifouling property and fouling-resistant property of the coating structure. The results are listed in table 1.

TABLE 1

| | Coating density (ng/cm$^2$) | Contact angle | Reduced percentage of bacteria, % | | Reduced percentage of protein, % |
|---|---|---|---|---|---|
| | | | P. aeruginosa | S. epidermidis | |
| embodiment 1 | 60.6 | <5° | >99 | >95 | 80 |
| embodiment 2 | 53 | <5° | >99 | >95 | 75 |
| embodiment 3 | 30.4 | <5° | >99 | >95 | 70 |
| embodiment 4 | 27.2 | <10° | >99 | >90 | 70 |
| embodiment 5 | 24.1 | <10° | >95 | >87 | 70 |
| comparative example 1 | 13.4 | 12° | >90 | >80 | 40 |

As the result listed in table 1, the coating density of comparative example 1 is 13.4 ng/cm$^2$, and the contact angle of which is 12°. In contrast, when a coating density of cysteine betaine on a metal carrier board is greater than 15 ng/cm$^2$, the contact angle of which is less than 10°. Therefore, the "superhydrophilic coating structure" and the "superhydrophilic material layer" in the present disclosure is defined by the contact angle of the coating structure being less than 10°, in which a coating density of cysteine betaine on a metal carrier board is greater than 15 ng/cm$^2$, preferably greater than 30 ng/cm$^2$. When a coating density of cysteine betaine on a metal carrier board is greater than 30 ng/cm$^2$, the contact angle of which is less than 5°.

It's worthy noting that, because a coating density of cysteine betaine on a metal carrier board is greater than 15 ng/cm$^2$, the reduced percentages of P. aeruginosa in embodiments 1-5 may be greater than 95%, and the reduced percentages of S. epidermidis in the same may be greater than 87%. The reduced percentages of bacteria in embodiments 1-5 are all significantly greater than that in comparative example 1. In another aspect, compared to the reduced percentage of protein in comparative example 1 (40%), the reduced percentages of protein in embodiments 1-5 are all greater than or equal to 70%, and even up to 80%.

Accordingly, the coated structure provided by embodiments of the present disclosure has a superhydrophilic material layer, so that the contact angle, and the reduced percentages of bacteria and proteins of which are all better than a comparative example. Further, in an embodiment of the present disclosure, the coated structure may be used as an antifouling material on a surface. The coated structure includes a carrier board and the mentioned superhydrophilic material layer. The carrier board has a surface, and the superhydrophilic material layer is coated on the surface of the carrier board. In another embodiment of the present disclosure, the coated structure may be used as a fouling-resistant material on a surface. The coated structure includes a carrier board and the mentioned superhydrophilic material layer. The carrier board has a surface, and the superhydrophilic material layer is coated on the surface of the carrier board.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A coated structure, comprising:
a carrier board having a surface; and
a superhydrophilic material layer coated on the surface of the carrier board, the superhydrophilic material layer comprising a zwitterionic compound having a structure of chemical formula I:

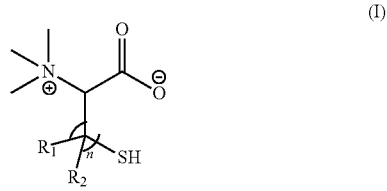

wherein $R_1$ and $R_2$ are individually hydrogen (H), methyl group (—CH$_3$), ethyl group (—C$_2$H$_5$) or propyl group (—C$_3$H$_7$), and n is an integer of 1-20.

2. The coated structure of claim 1, wherein a material of the carrier board comprises metal selected from the group consisting of silver, gold, copper, iridium, nickel, germanium, mercury, palladium, ruthenium, zinc, iron, barium, yttrium, gallium, cadmium, indium and a combination thereof.

3. The coated structure of claim 1, wherein a material of the carrier board comprises metal selected from the group consisting of mercury telluride (HgTe), cadmium telluride (CdTe), cadmium sulfide (CdS), silver sulfide (AgS), palladium sulfide (PdS), zinc sulfide (ZnS), gallium arsenide (GaAs), indium phosphide (InP), yttrium barium copper oxide (YBaCuO$_x$) and a combination thereof.

4. The coated structure of claim 1, wherein a material of the carrier board comprises a stainless steel.

5. The coated structure of claim 1, wherein $R_1$ and $R_2$ are individually hydrogen (H), and n is 1.

6. The coated structure of claim 1, wherein $R_1$ and $R_2$ are individually methyl group (—CH$_3$), and n is 1.

7. The coating structure of claim 1, wherein the zwitterionic compound is adsorbed on the carrier board by a thiol group (—SH).

8. The coating structure of claim 1, wherein a coating density of the zwitterionic compound on the carrier board is greater than or equal to 15 ng/cm$^2$.

9. The coating structure of claim 1, wherein a coating density of the zwitterionic compound on the carrier board is greater than or equal to 30 ng/cm$^2$.

10. A method for treating a metal carrier board comprising:
spraying a superhydrophilic material layer on a surface of the metal carrier board, wherein the superhydrophilic material layer comprising a zwitterionic compound having a structure of chemical formula I:
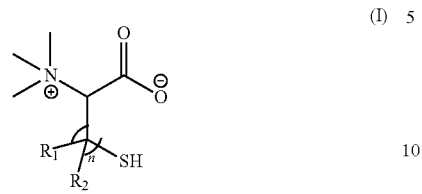
(I)
wherein $R_1$ and $R_2$ are individually hydrogen (H), methyl group (—$CH_3$), ethyl group (—$C_2H_5$) or propyl group (—$C_3H_7$), and n is an integer of 1-20.
11. A method for fouling-resistant treatment comprising the coated structure of claim 1.
* * * * *